United States Patent
DiTullio (10) Patent No.: US 10,179,989 B2
(45) Date of Patent: *Jan. 15, 2019

(54) STORMWATER CHAMBER WITH STACKABLE REINFORCING RIBS

(71) Applicant: Robert J. DiTullio, Brookfield, CT (US)

(72) Inventor: Robert J. DiTullio, Brookfield, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/707,578

(22) Filed: Sep. 18, 2017

(65) Prior Publication Data

US 2018/0038090 A1 Feb. 8, 2018

Related U.S. Application Data

(63) Continuation of application No. 15/231,222, filed on Aug. 8, 2016, now Pat. No. 9,765,509.

(51) Int. Cl.
| | |
|---|---|
| *E02B 11/00* | (2006.01) |
| *E03F 1/00* | (2006.01) |
| *B29C 44/02* | (2006.01) |
| *B29C 44/38* | (2006.01) |
| *B29C 44/42* | (2006.01) |
| *B29K 105/04* | (2006.01) |
| *B29L 31/00* | (2006.01) |

(52) U.S. Cl.
CPC ............. *E03F 1/003* (2013.01); *B29C 44/02* (2013.01); *B29C 44/38* (2013.01); *B29C 44/42* (2013.01); *B29K 2105/04* (2013.01); *B29K 2995/0078* (2013.01); *B29L 2031/712* (2013.01); *B29L 2031/7739* (2013.01)

(58) Field of Classification Search
CPC ......... E02B 11/00; E02B 11/005; E03F 1/003
USPC ................. 405/36, 43, 46, 49, 50, 124, 126
See application file for complete search history.

(56) References Cited

U.S. PATENT DOCUMENTS

| | | |
|---|---|---|
| 980,442 A | 1/1911 | Schlafly |
| 2,876,801 A | 3/1959 | November |
| (Continued) | | |

FOREIGN PATENT DOCUMENTS

IE    S20080166 A2    9/2008

OTHER PUBLICATIONS

CONTECH Construction Products, Inc., "ChamberMaxx The CONTECH Plastic Stormwater Retention Solution", 2008, 2 pages.

(Continued)

*Primary Examiner* — Frederick L Lagman
*Assistant Examiner* — Stacy N Lawson
(74) *Attorney, Agent, or Firm* — St Onge Steward Johnston and Reens LLC (57) ABSTRACT

An arch-shaped corrugated chamber having corrugation peaks and valleys, with reinforcing ribs provided on the corrugation peaks. The ribs extend upwardly from a chamber base to a rib upper end, and have an arch-shaped cross-section with an outer surface extending outwardly from a corrugation peak and a fin extending inwardly from the corrugation peak, and optionally, a rib line provided on the rib outer surface on the rib arch-shaped cross-section. A channel formed by the inner surface of the rib is sized to receive a corresponding rib of a second chamber so that multiple similar chambers with ribs may be stacked together.

21 Claims, 7 Drawing Sheets

(56) References Cited

U.S. PATENT DOCUMENTS

| | | |
|---|---|---|
| 3,855,799 A | 12/1974 | Martin et al. |
| 4,113,818 A | 9/1978 | Drossbach |
| 4,360,042 A | 11/1982 | Fouss et al. |
| 5,087,151 A | 2/1992 | DiTullio |
| 5,419,838 A | 5/1995 | DiTullio |
| 5,573,038 A | 11/1996 | Kanao |
| 6,123,113 A | 9/2000 | Pontbriand et al. |
| 6,322,228 B1 | 11/2001 | Feldman |
| 6,497,333 B1 | 12/2002 | Ellis et al. |
| 7,052,209 B1 | 5/2006 | Kruger et al. |
| 7,118,306 B2 | 10/2006 | Kruger et al. |
| 7,226,241 B2 | 6/2007 | DiTullio |
| 7,306,399 B1 | 12/2007 | Smith |
| D613,819 S | 4/2010 | DiTullio |
| 8,425,148 B2 | 4/2013 | DiTullio |
| 8,491,224 B2 | 7/2013 | Cobb et al. |
| 8,672,583 B1 | 3/2014 | Mailhot et al. |
| D737,927 S | 9/2015 | DiTullio |
| 9,255,394 B2 | 2/2016 | Mailhot et al. |
| 2008/0240859 A1* | 10/2008 | Sipaila ............ E03F 1/003 405/46 |
| 2009/0220302 A1 | 9/2009 | Cobb et al. |

OTHER PUBLICATIONS

"Cultec Recharger V8 Specification Sheet", Cultec, Inc., Feb. 2008, 1 page.

Rosato, et al., "Designing with Plastics and Composites A Handbook", 1991, 23 pages.

Plastic Part Design for Injection Molding, 20 page document, Undated.

The Society of the Plastics Industry, Inc., "Standards and Practices of Plastics Molders and Plastics Molded Parts Buyers Guide", 1978, 46 pages.

Prof. Ben Schafer, "Thin-Walled Structures Thin-Walled Thermoplastic Pipe", 2005, 2 pages.

\* cited by examiner

STORMWATER CHAMBER WITH STACKABLE REINFORCING RIBS

FIELD OF THE INVENTION

This application relates generally to molded plastic chambers for water detention and, more particularly to open bottomed, arch-shaped molded plastic chambers that are buried in the ground and receive stormwater runoff from paved and roofed areas for storage and release into the local water table to replenish groundwater supply.

BACKGROUND OF THE INVENTION

Stormwater runoff collected from roof areas and paved areas were historically directed into municipal stormwater drainage systems and released into a local body of water. However, regulatory changes and good practice now mandate that stormwater runoff must be collected and directed to local soil where it can replenish groundwater supplies.

The traditional construction of stormwater handling systems has been concrete tanks or infiltration trenches filled with large gravel or crushed stone with perforated pipes running therethrough. Such stone filled trench systems are non-economical and/or inefficient since the stone occupies a substantial volume, limiting the ability of the system to handle large surge volumes associated with heavy storms. Both the stone and the perforated pipe are also susceptible to clogging by particles or debris carried by water.

Molded plastic chamber structures were introduced to the market to take the place of concrete structures for handling stormwater. U.S. Pat. No. 5,087,151 to Robert J. DiTullio, the disclosure of which is hereby incorporated by reference, is an early patent in the field which discloses a drainage and leaching field system comprising vacuum-molded polyethylene chambers that are designed to be connected and locked together in an end-to-end fashion to provide a water handling system.

Stormwater chambers typically have a corrugated arch-shaped cross-section and are relatively long with open bottoms for dispersing water to the ground. The chambers are typically buried within crushed stone aggregate or other water permeable granular medium that typically has 20-40 percent or more void space. The chambers serve as water reservoirs in a system that includes both the chambers and surrounding crushed stone. The crushed stone is located beneath, around, and above the chambers and acts in combination with the chambers to provide paths for water to percolate into the soil, and also provides a surrounding structure that bears the load of any overlying materials and vehicles. The chambers will usually be laid on a crushed stone bed side-by-side in parallel rows, then covered with additional crushed stone to create large drainage systems. End portions of the chambers may be connected to a catch basin, typically through a pipe network, in order to efficiently distribute high velocity stormwater. Examples of such systems are illustrated in U.S. Pat. Nos. 7,226,241 and 8,425,148 to Robert J. DiTullio, the disclosures of which are also incorporated by reference.

The use of molded plastic chamber structures has grown substantially since their initial introduction to the market, and have replaced the use of concrete structures in many applications. Molded plastic chamber structures provide a number of distinct advantages over traditional concrete tanks or stone-filled trench systems. For example, concrete tanks are extremely heavy requiring heavy construction equipment to put them in place. Stone-filled trench systems are expensive and inefficient since the stone occupies a substantial volume, limiting the ability of the system to handle large surge volumes of water associated with heavy storms.

More recently, manufacturers have begun to offer taller chambers which offer larger volume and storage capacity. Examples of recently introduced large capacity chambers include the Cultec® 902HD®, Contech® Chambermaxx®, Stormtech® MC-3500 and 4500, Prinsco® HS180, and Lane SK180.

A design consideration associated with larger size stormwater chambers is that such structures may experience greater load stress than smaller chambers. A chamber should have a load bearing strength capable of bearing the load of the overlaying crushed stone and paving, and loads corresponding to use of construction equipment and vehicular traffic over the location of the buried chamber. Therefore, use of sub-corrugations molded into the corrugations to improve the strength of larger size plastic stormwater chambers has been proposed. U.S. Pat. No. 8,491,224 describes a chamber for stormwater runoff with sub-corrugation features on corrugation peaks and/or corrugation valleys. U.S. Pat. No. 8,672,583 similarly describes a plastic stormwater chamber with sub-corrugations that run along peak corrugations or valley corrugations. U.S. Pat. No. 8,672,583 defines sub-corrugations as "smaller or secondary corrugations which are superimposed on the corrugations." (U.S. Pat. No. 8,672,583 at Col. 3, lines 26-27; see also Col. 6, lines 53-57).

A commercially acceptable product is required to fit on a standard size pallet and to be stackable such that a commercially acceptable quantity of product can be shipped on each pallet. Typically, a pallet may not exceed 40×48 inches in size and/or 84 inches in height, although the exact size is determined by each carrier. Although shipping costs are typically based on weight, many carriers also offer a per-pallet pricing where the shipper pays fixed amount per pallet no matter what the freight commodity or the freight class. It is commercially desirable to fit as much product on a pallet as possible, in order to minimize shipping costs. Thus products are designed in order to be fitted on and shipped with the maximum quantity of product on a pallet. In the case of plastic stormwater chambers this means that desirably six or more large size chambers can fit on a pallet so that the value of product shipped is commercially proportionate to the shipping cost. A plastic stormwater storage chamber designed so that four or less large size chambers fit on a pallet would not provide a value of product shipped that is commercially proportionate to the shipping cost.

Identically-formed chambers with corrugations can be readily stacked as they nest together one on top of the other sufficiently closely that the quantity of product on a pallet is commercially acceptable. Chambers with sub-corrugations on the corrugations nest together and can be stacked in a way that permits a commercially acceptable quantity of product to be loaded on a pallet. But chambers that do not nest together will not permit packing a sufficient number of chambers on a pallet.

One example of chambers that have heretofore been considered undesirable because of the inability to nest them together for packing are stormwater chambers with reinforcing ribs or fins instead of subcorrugations. Ribs and fins are relatively narrow plastic structures used for strengthening. A properly-sized rib or fin can provide greater strengthening effect and stiffness relative to a sub-corrugation. However, the increase in strength provided has heretofore been at the loss in commercial acceptability in packaging, particularly with respect to larger size chambers. The use of reinforcing ribs or fins or other increases in wall thickness prevents the chambers from nesting together in a stack. The stacking and other problems associated with use of ribs or fins is well recognized in the art. (See e.g. U.S. Pat. No. 8,672,583 at Col. 2, lines 6-12, and 46-52, and Col. 4, lines 4-9.) As such, ribs and fins are generally considered by persons of ordinary skill in the art to be a distinctly different feature than a sub-corrugation. See e.g. U.S. Pat. No. 8,672,583 at col. 6, lines 64-67.

Therefore, there continues to be a need in the stormwater management field for larger size chambers that have strengthening elements that have both the strength of ribbing, and the stackability of sub-corrugations. The desired chamber would be both stronger than existing design approaches, and also be adapted for efficient and cost effective distribution and transportation of such chambers.

SUMMARY OF THE INVENTION

Accordingly, it is an object of the present invention to provide a stormwater chamber with reinforcing ribs. It is a further object of the present invention to provide such a stormwater chamber that is readily stackable for transport and storage. It is a further object to provide a method of manufacturing such a stormwater chamber.

These and other objectives are achieved by providing a plastic arch-shaped corrugated chamber having a plurality of corrugation peaks and a plurality of corrugation valleys, with reinforcing ribs provided on the corrugation peaks. The ribs extend upwardly from a chamber base to a rib upper end. The ribs have an arch-shaped cross-section which extends outwardly from a corrugation peak and a fin which extends inwardly from a center of the arch-shaped cross-section. The arch-shaped cross-section has a depth, and the fin has a depth which is less than the depth of the arch-shaped cross-section. A rib line is provided on the rib outer surface on the rib arch-shaped cross-section and aligned with the fin.

The arch-shaped cross-section and the fin define a channel. The channel is sized to receive a corresponding rib of a second chamber so that multiple similar chambers with reinforcing ribs may be stacked together. Preferably, the rib extends upwardly from the chamber base to a rib upper end, and the rib arch-shaped cross-section depth and fin depth taper from a greater depth adjacent to the chamber base to a lesser depth adjacent to the rib upper end such that the channel has a varying depth ranging from a maximum depth adjacent the base to a minimum depth adjacent a location above the base.

Preferably, the rib has a vertical height which is between 30% to 80% of a vertical height of the chamber, and more preferably between 40% to 60% of the vertical height of the chamber.

The chamber may be formed of a molded plastic sheet, or by injection molding, but most preferably is a cellular plastic material.

Other objects of the present invention are achieved by provision of a method of manufacturing a chamber, comprising steps of: providing a polymer melt; injecting a $CO_2$ blowing agent into the polymer melt; injecting the polymer melt and $CO_2$ blowing agent into a mold cavity, the mold cavity defining a plastic arch-shaped corrugated chamber having a plurality of corrugation peaks and a plurality of corrugation valleys distributed along a length of the chamber, the corrugation peaks and valleys having a thickness, the corrugation peaks and corrugation valleys extending transverse to a lengthwise axis of the chamber, the chamber having a top portion and two side portions, with a base at a lower end of each side portion, and a rib provided on a plurality of the plurality of corrugation peaks, each rib having an arch-shaped cross-section with an outer surface extending outwardly from a corrugation peak and a fin extending inwardly from the corrugation peak.

Other objects of the invention and its particular features and advantages will become more apparent from consideration of the following drawings and accompanying detailed description.

DETAILED DESCRIPTION OF THE INVENTION

Figure 1:
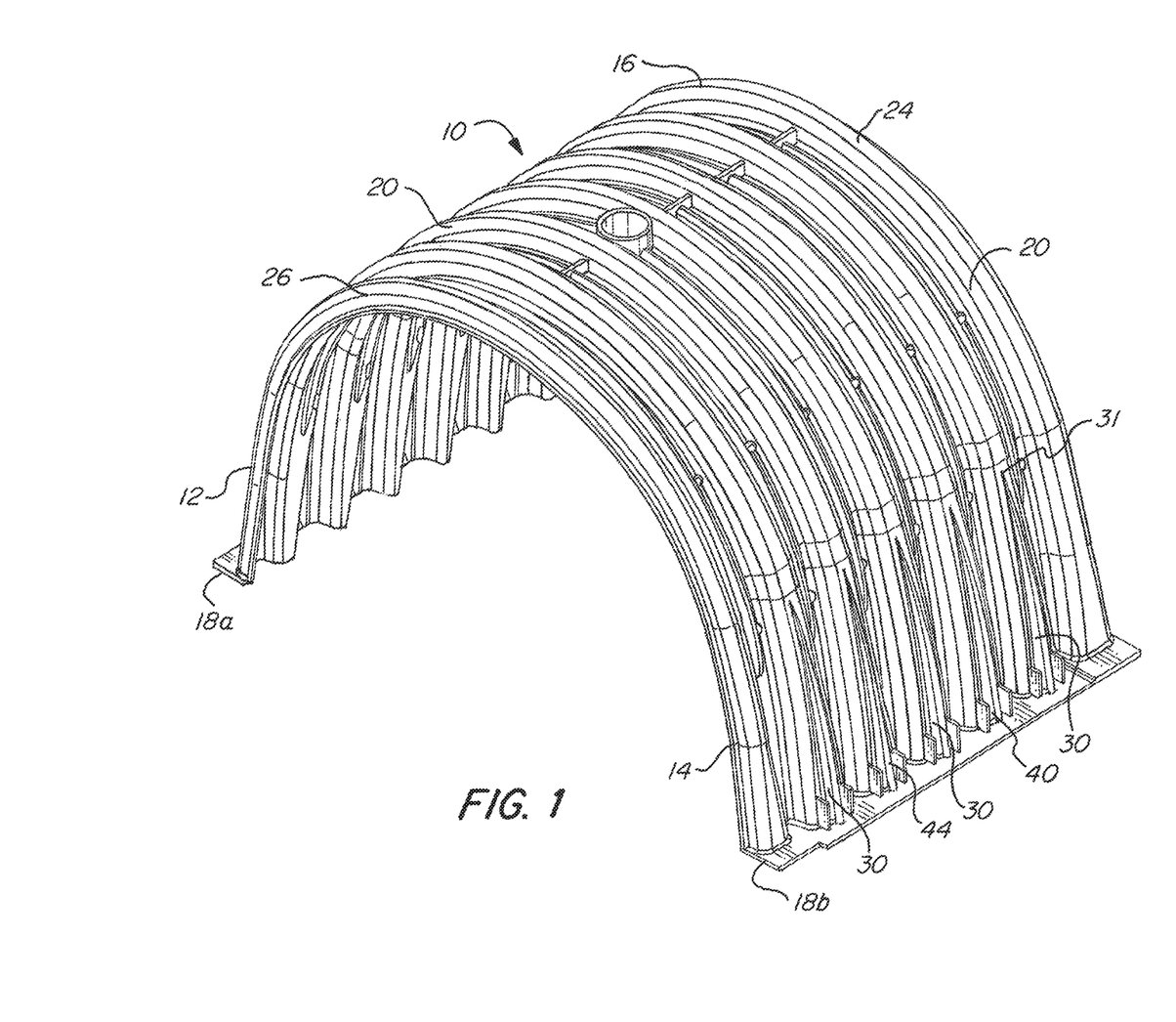
FIG. 1 is a front, top and left side perspective view of a chamber according to an exemplary embodiment of the present invention.

FIG. 1 illustrates a plastic stormwater chamber 10 according to an exemplary embodiment of the present invention. The chamber 10 has a generally arch-shaped cross-section defined by two sidewalls 12, 14, running the length of the chamber 10 between a first end and a second end, and a top wall 16 there between. The first sidewall 12 has a base 18*a* and the second sidewall 14 has a base 18*b*.

The plastic arch-shaped chamber 10 is corrugated and has a plurality of corrugation peaks 20 and a plurality of corrugation valleys 22 distributed along a length of the chamber. The corrugation peaks 20 and corrugation valleys 22 extend transverse to a lengthwise axis of the chamber 10. The corrugation peaks 20 and valleys 22 have a thickness which is generally uniform and reflects the thickness of the material which is used to form chamber 10. In one embodiment of the invention, the material thickness is 0.375 inch. The corrugation peaks 20 and valleys 22 act as circumferential reinforcing members to provide strength and rigidity to the chamber 10. In preferred embodiments, the chamber 10 has a smaller corrugation 24 at one end and a larger corrugation 26 at the other end, whereby the larger corrugation 26 can overlap the smaller corrugation 24 to connect the chambers together, as described in U.S. Pat. No. 5,087,151.

Figure 6:
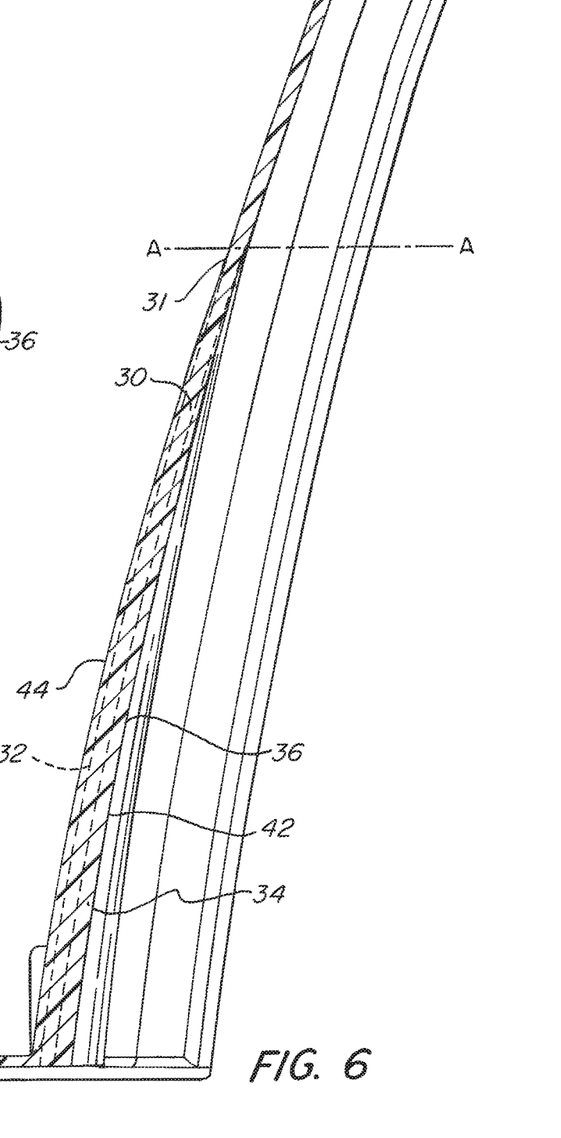
FIG. 6 is a partial sectional view of the stormwater chamber at the section 6-6 shown in FIG. 2.

In accordance with the invention, reinforcing ribs 30 are provided on one or more of the corrugation peaks 20. Preferably, the ribs 30 are provided on all corrugation peaks 20 except for the corrugations 24 and 26 at each end of the chamber. Ribs 30 extend upwardly from the chamber bases 18*a*, 18*b* to a rib upper end 31. The rib has a vertical height as illustrated in FIG. 6 as the vertical distance between the plane of the base 18*b* and the line A-A. The rib vertical height is between 30% to 80% of a vertical height of the chamber, and optionally may be between 40% to 60% of the vertical height of the chamber. In one embodiment, each of the ribs 30 rises to a height that is less than half the height of the chamber 10.

Figure 7:
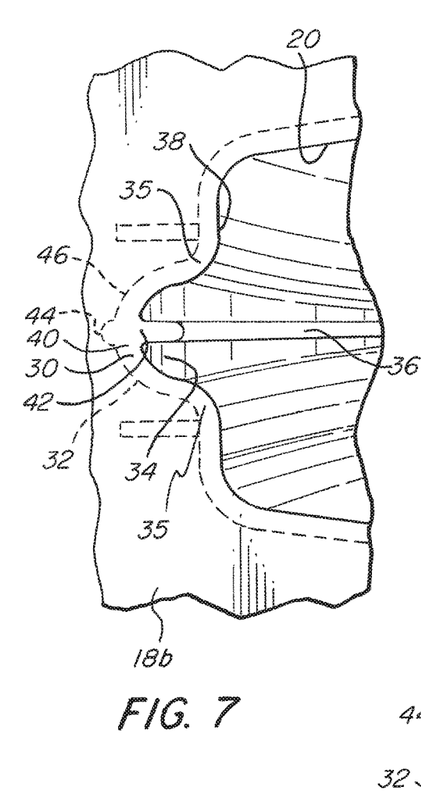
FIG. 7 is a detail bottom plan view of the bottom of a stormwater chamber, at the location 7 shown in FIG. 4, illustrating a rib.
Figure 8:
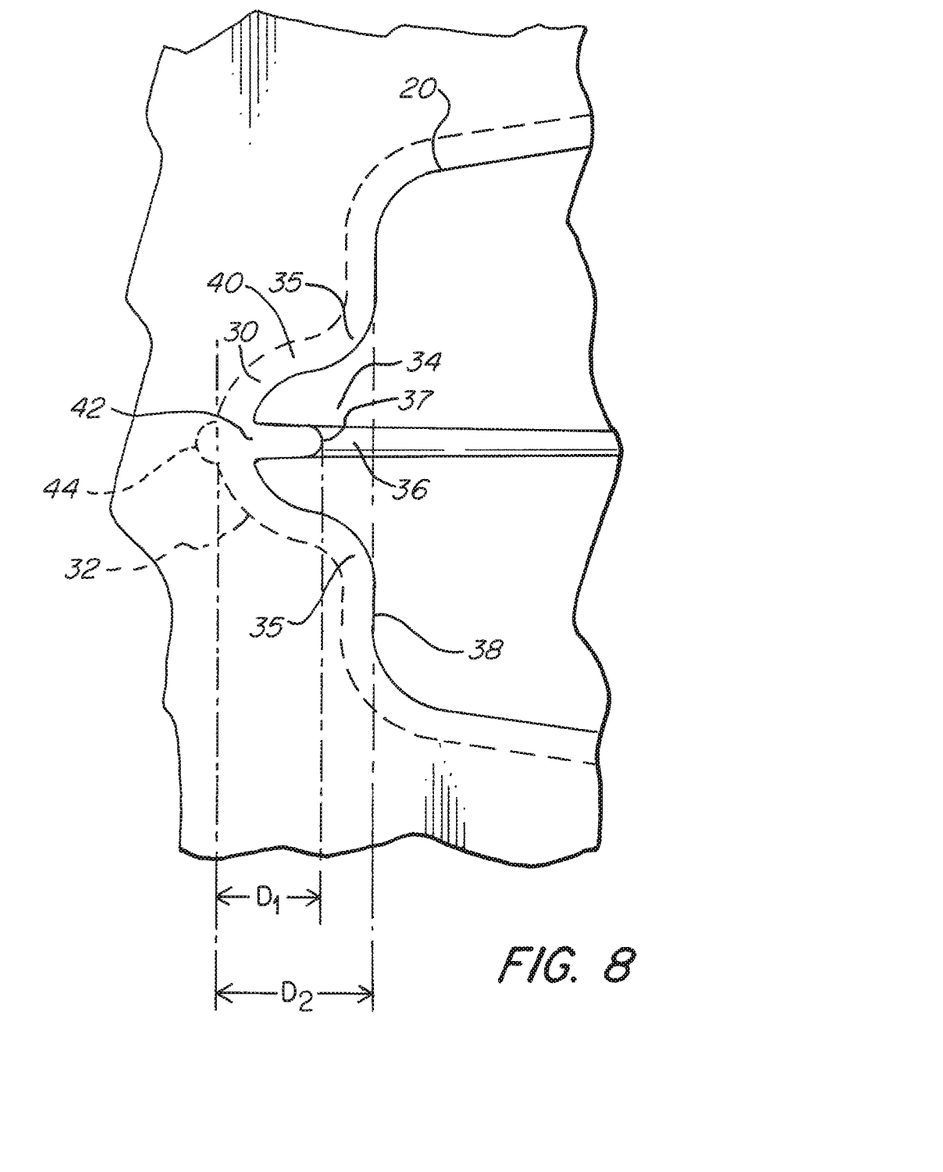
FIG. 8 is a detail bottom view of FIG. 7 illustrating the rib.

Ribs 30 have an arch-shaped cross-section 40 as seen in FIGS. 7 and 8. The arch-shaped cross-section 40 extends outwardly from a corrugation peak 20 from locations 35. A fin 36 extends inwardly from a center 42 of the arch-shaped cross-section 40. Fin 36 extends perpendicularly to the surface of the arch-shaped cross-section 40 from the inner wall of the rib 30. Fin 36 has a depth which is less than the depth of the rib arch-shaped cross-section 40. Preferably, fin 36 has a width which tapers from center 42 of the arch-shaped cross-section 40 to fin end 37. A rib line 44 is provided on the rib 30 outer surface and may be centered on the rib arch-shaped cross-section 40 and aligned with the fin 36.

In one embodiment, chamber 10 has a material thickness of 0.375 inch. Fin 36 has a width of 0.30 inch tapering to 0.25 inch at fin end 37, and a depth of 0.625 inch at bases 18a, 18b tapering to 0.1 inch at rib upper end 31 where it tapers into the surface of corrugation peak 20. Rib line 44 has a width of 0.30 inch and a depth of 0.17 inch which also tapers into the surface of corrugation peak 20. Accordingly, the thickness of corrugation peak 20 in the area of rib 30 across the width of the rib 30 changes greatly due to the additional thickness provided by the depth of fin 36 and the rib line 44. The total thickness of the corrugation peak 20 in the area of rib 30 may be 1.17 inch, which is substantially greater than the 0.375 inch thickness of thickness of corrugation peak 20.

Referring now to FIGS. 3, 4, 7, and 8, as seen therein, arch-shaped cross-section 40 of rib 30 preferably is a curved cross-sectional shape and the exterior surface 32 thereof is curved and arch-shaped. A curved cross-sectional shape is preferred, but optionally the exterior surface 32 of the ribs 30 may have different shapes and/or cross-sections such as triangular, rectangular, or tapered with flat distal ends.

The shape of the arch-shaped cross-section 40 and fin 36 define a channel 34. Channel 34 has a depth which is the difference between the inner wall 38 of crest corrugation 20 and the fin end 37 which is the inner surface of fin 36. Channel 34 has a depth varying from maximum depth adjacent the base 18a, 18b to a minimum depth adjacent a location above the base 18a, 18b. In one embodiment, the channel 34 minimum depth is located at the rib upper end 31.

For example, as seen in FIG. 8, the arch-shaped cross-section 40 and fin 36 may have a depth ($D_1$) as measured between the outer wall 46 of the arch-shaped cross-section 40 and the fin end 37 of fin 36 of approximately one (1) inch at the base. The overall depth ($D_2$) between the outer wall 46 of the arch-shaped cross-section 40 and the inner wall 38 of the peak corrugation 20 may be 1.375 inches. In such case, the channel 34 will have a depth of 0.375 inches at the base.

Figure 2:
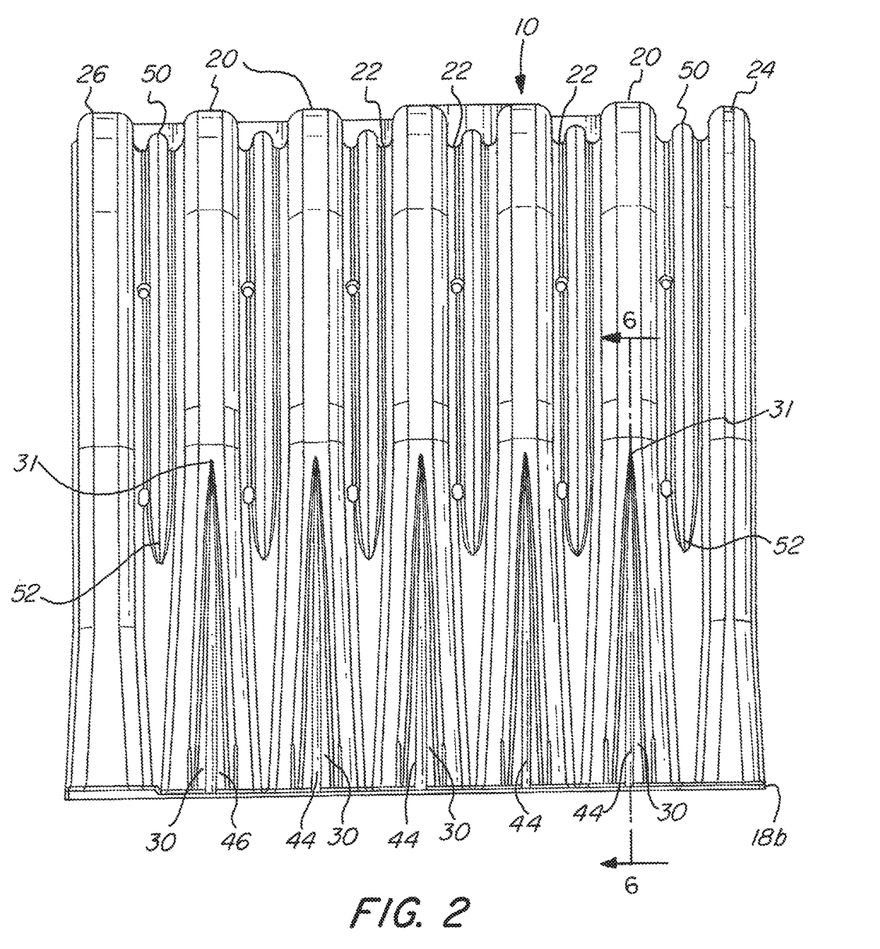
FIG. 2 is a left side elevation view of the stormwater chamber shown in FIG. 1.
Figure 3:
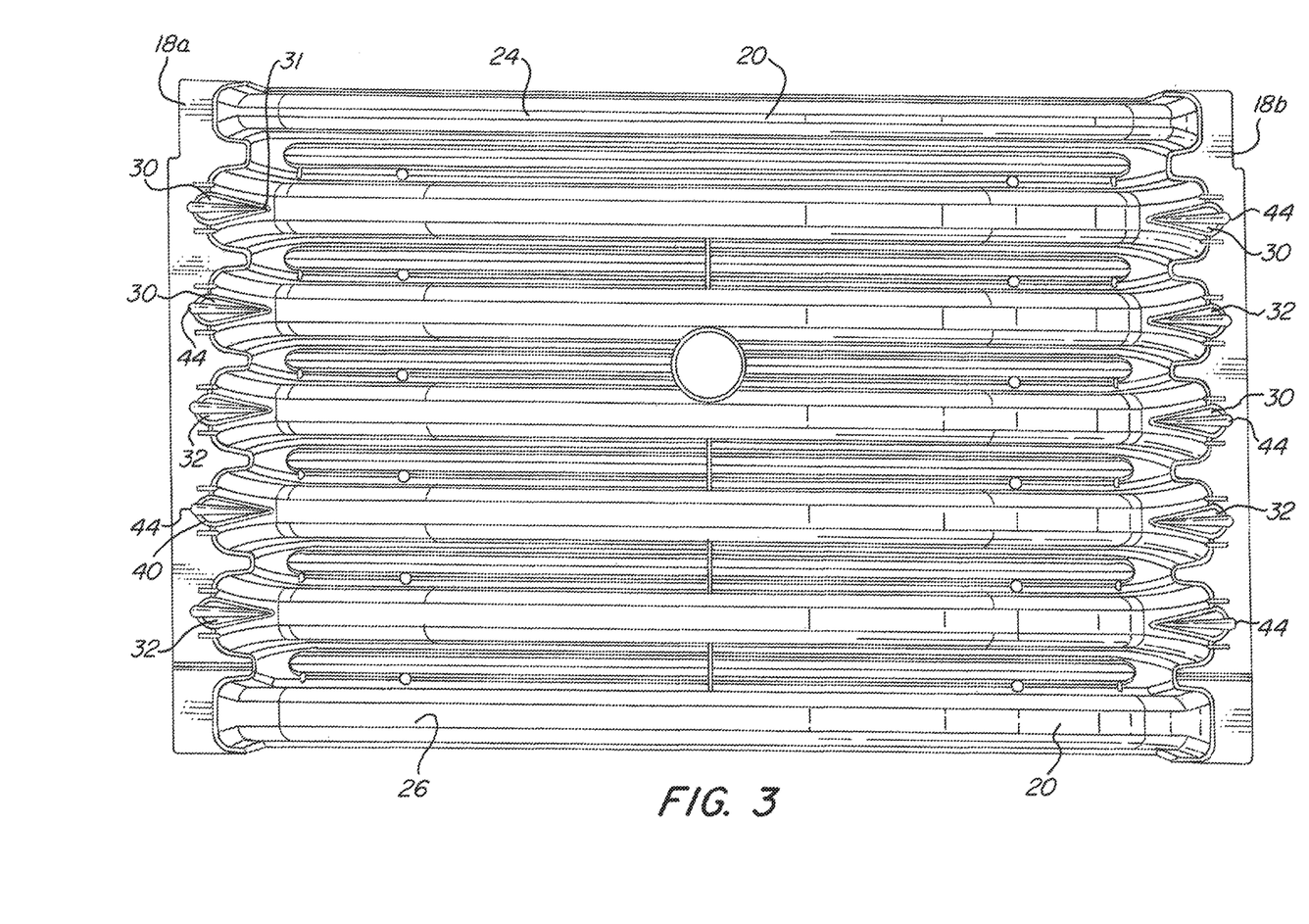
FIG. 3 is a top plan view of the stormwater chamber shown in FIG. 1.
Figure 4:
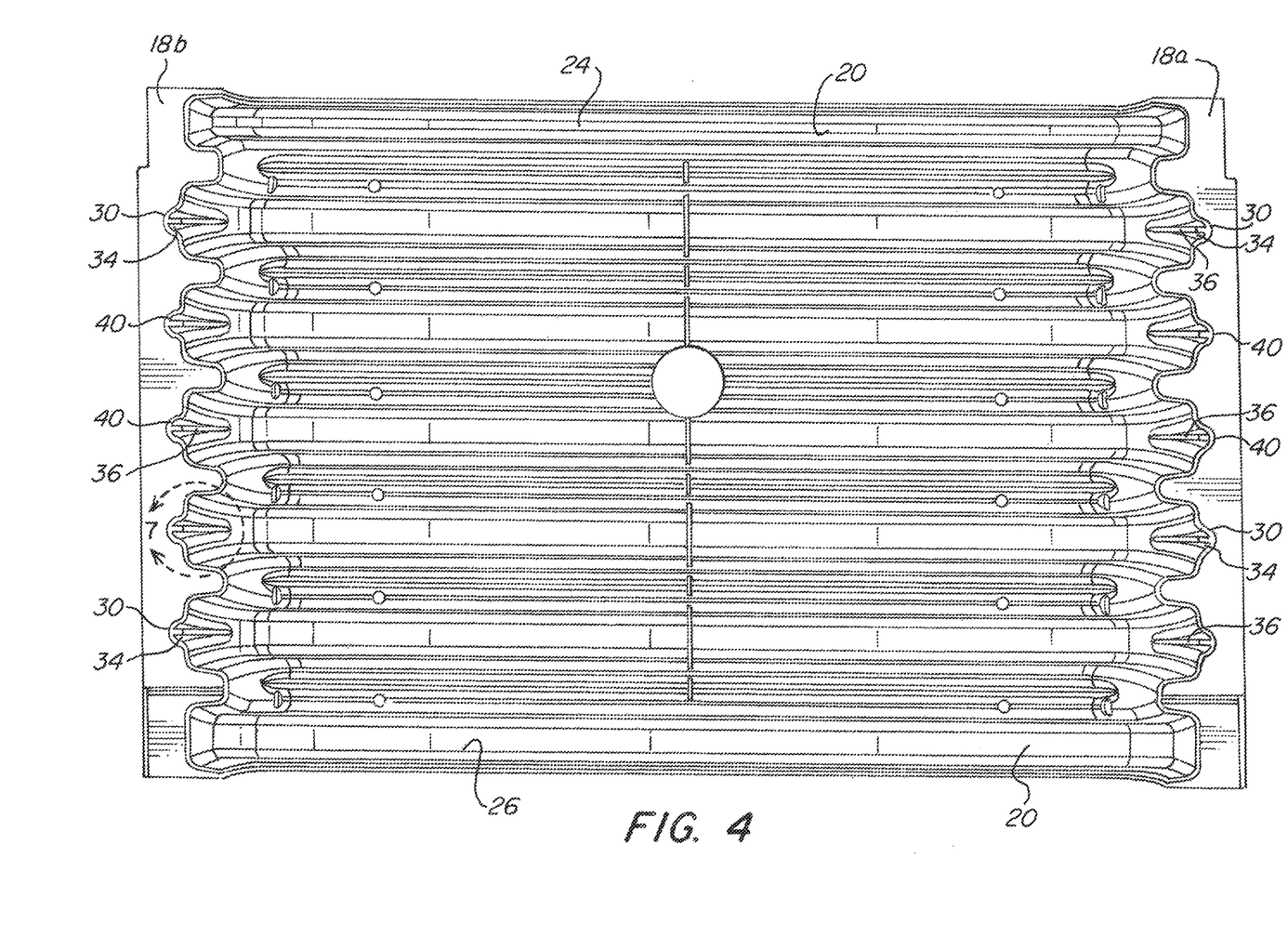
FIG. 4 is a bottom plan view of the stormwater chamber shown in FIG. 1.
Figure 5:
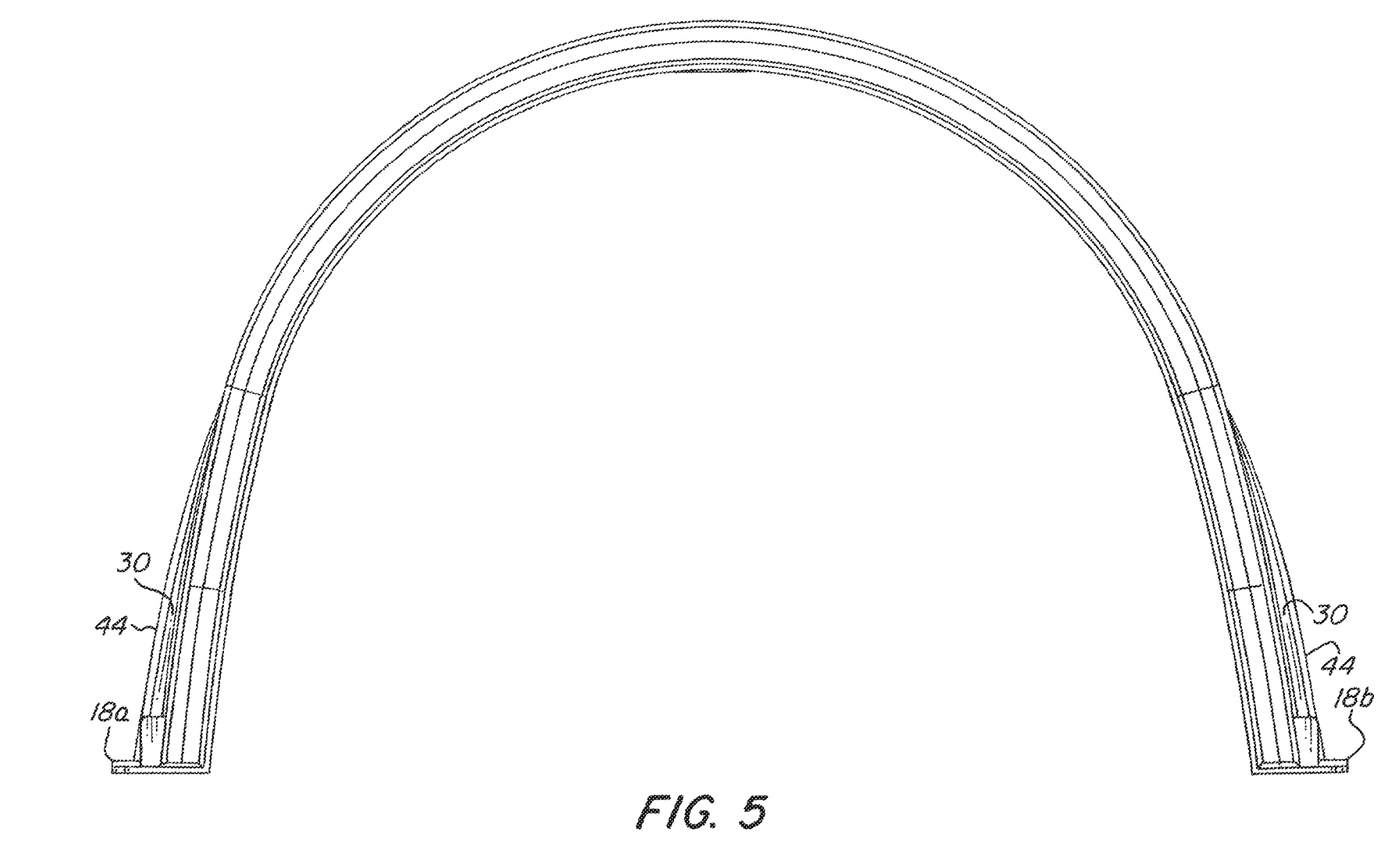
FIG. 5 is a front elevation view of the stormwater chamber shown in FIG. 1.

The rib 30 and its arch-shaped cross-section 40 decrease in size from the base 18a, 18b to the rib upper end 31. In a preferred embodiment as seen in FIG. 2, the width of each rib 30 decreases between the base 18a, 18b and the rib upper end 31. The width of rib 30 at the base 18 is greater than its width at rib upper end 31. In this embodiment each of the corrugation peaks 20 also has a width that decreases between the base 18a, 18b and the rib upper end 31. In addition to a decreasing width, the rib 30 and its arch-shaped cross-section 40, and fin 36 decrease in depth from the base 18a, 18b to the rib upper end 31. Consequently, channel 34 also decreases in depth from the base 18a, 18b to the rib upper end 31.

The channel 34 is sized to receive a corresponding rib 30 of a second chamber so that multiple similar chambers with reinforcing ribs 30 may be stacked together. The design of rib 30 with channel 34 permits stacking the chambers 30 which still maintaining the strength of a ribbed structure. A rib 30 of a lower stacked chamber 10 can nest against and at least partially into the channel 34 of an upper stacked chamber 10.

Ribs 30, featuring the combination of the arch-shaped cross-section 40 and the fin 36 have significantly strength modulus compared to corrugations or sub-corrugations with uniform wall thicknesses Although ribs 30 are shown on the exterior of the corrugation peaks 20, the ribs 30 may alternatively be on the interior of the corrugation peaks 20, or in some embodiments, on the corrugation valleys 22 between the corrugation peaks 20.

Chamber 10 optionally includes valley subcorrugations 50 on the corrugation valleys 22. Valley subcorrugations 50 extend across the top wall 16 and downwardly along part of the two sidewalls 12, 14. Preferably, the valley subcorrugations 50 extend downwardly sufficiently that the lower ends 52 of valley subcorrugations 50 are located below the rib upper ends 31. The overlapping of the ribs 30 and valley subcorrugations 50 provides stronger sidewalls 12, 14 because there is no unreinforced zone in an area of potential load stress.

Chamber 10 may be formed of a molded plastic sheet, or by injection molding, but most preferably is a cellular plastic material. A method of manufacturing a chamber 10, comprises the steps of: providing a polymer melt which can be a single polymer or a copolymer blend; then injecting a CO2 blowing agent into the polymer melt; and injecting the polymer melt and CO2 blowing agent into a mold cavity. The mold cavity defines the plastic arch-shaped corrugated chamber 10 having a plurality of corrugation peaks 20 and a plurality of corrugation valleys 22 distributed along a length of the chamber 10, and ribs 30 provided on a plurality of the plurality of corrugation peaks, as previously described.

In one embodiment of the invention, chamber 10 has an axial length of 1.25 meters, a width of 1.981 meters, and a height of 1.219 meters, and provides a storage volume for collected water of 1.84 m³/unit.

Although the invention has been described with reference to a particular arrangement of parts, features and the like, these are not intended to exhaust all possible arrangements or features, and indeed many modifications and variations will be ascertainable to those of skill in the art.

What is claimed is:

1. A chamber, comprising:
   a cellular plastic foam arch-shaped corrugated chamber having a plurality of corrugation peaks and a plurality of corrugation valleys distributed along a length of the chamber, the corrugation peaks and corrugation valleys extending transverse to a lengthwise axis of the chamber, the chamber having a top portion and two side portions, with a base at a lower end of each side portion;
   a rib provided on a plurality of the plurality of corrugation peaks, each rib having an outer surface extending outwardly from a corrugation peak and a fin extending inwardly, wherein each rib has an outwardly extending arch-shaped cross-section with the fin extending inwardly from the rib arch-shaped cross-section, the rib arch-shaped cross-section having a depth and the fin having a depth, and wherein the fin depth is less than the depth of the rib arch-shaped cross-section, and wherein each rib extends upwardly from one of the bases to a rib upper end, and the rib arch-shaped cross-section decreases in size from the one of the bases to the rib upper end;

the rib having a depth, the rib depth and the fin depth tapering from a greater depth adjacent to the one of the bases to a lesser depth above the one of the bases; and whereby the rib and the fins define a channel sized to receive a corresponding rib of a second chamber, the channel having a depth varying from a maximum depth adjacent the one of the bases to a minimum depth adjacent a location above the one of the bases.

2. The chamber of claim 1, wherein a rib line is provided on the rib outer surface on the rib arch-shaped cross-section.

3. The chamber of claim 2, where the rib line is an outwardly extending solid rib.

4. The chamber of claim 2, where the rib line is an outwardly extending fin.

5. The chamber of claim 1, wherein the rib has a vertical height which is 30% to 80% of a vertical height of the chamber.

6. The chamber of claim 5, wherein the rib vertical height is 40% to 60% of the vertical height of the chamber.

7. The chamber of claim 1, wherein the channel minimum depth is located at the rib upper end.

8. A chamber, comprising:
a cellular plastic foam arch-shaped corrugated chamber having a plurality of corrugation peaks and a plurality of corrugation valleys distributed along a length of the chamber, the corrugation peaks and valleys having a thickness, the corrugation peaks and corrugation valleys extending transverse to a lengthwise axis of the chamber, the chamber having a top portion and two side portions, with a base at a lower end of each side portion;
a rib provided on a plurality of the plurality of corrugation peaks, each rib having an arch-shaped cross-section extending outwardly from a corrugation peak and having an outer wall, each rib further having a fin extending inwardly from the rib arch-shaped cross-section and a rib line on a rib outer surface on the rib arch-shaped cross-section;
each rib extending upwardly from one of the bases to a rib upper end;
the rib arch-shaped cross-section having a wall thickness and a depth, and the fin having a depth;
the fin depth being greater than the arch-shaped cross-section wall thickness at a location adjacent to the one of the bases and less than the rib arch-shaped cross-section depth;
the rib arch-shaped cross-section depth and the fin depth tapering from a greater depth adjacent to the one of the bases to a lesser depth above the one of the bases; and
whereby the rib arch-shaped cross-section and the fin define a channel sized to receive a corresponding rib of a second chamber, the channel having a depth varying from a maximum depth adjacent the one of the bases to a minimum depth adjacent a location above the one of the bases.

9. The chamber of claim 8, where the rib line is an outwardly extending solid rib.

10. The chamber of claim 8, where the rib line is an outwardly extending fin.

11. The chamber of claim 8, wherein the rib line is centered on the rib arch-shaped cross-section.

12. A chamber, comprising:
a plastic arch-shaped corrugated chamber having a plurality of corrugation peaks and a plurality of corrugation valleys distributed along a length of the chamber, the corrugation peaks and corrugation valleys extending transverse to a lengthwise axis of the chamber, the chamber having a top portion and two side portions, with a base at a lower end of each side portion;
a rib provided on a plurality of the plurality of corrugation peaks, the rib having an outwardly extending arch-shaped cross-section and a fin extending inwardly from the arch-shaped cross-section; and
the inwardly extending fin having a depth, the fin depth tapering from a greater depth adjacent to one of the bases to a lesser depth above the one of the bases.

13. The chamber of claim 12, wherein the fin has a vertical height which is 30% to 80% of a vertical height of the chamber.

14. The chamber of claim 13, wherein the fin vertical height is 40% to 60% of the vertical height of the chamber.

15. The chamber of claim 12, wherein the fin decreases in size from one of the bases to an upper end of the fin.

16. The chamber according to claim 12, wherein said chamber is formed of a cellular plastic foam.

17. A stormwater chamber, comprising:
an elongated body with a top portion, a first side portion, and a second side portion and a generally arch-shaped cross-section;
a base at a bottom of each of the first and second side portions;
a plurality of circumferential reinforcing members disposed along a lengthwise axis of said elongated body; and
a rib provided on a plurality of the circumferential reinforcing members, the rib having an outwardly extending arch-shaped cross-section and a fin extending inwardly from the arch-shaped cross-section, the fin extending upwardly from one of the bases to an upper end, the fin decreasing in depth from the one of the bases to its upper end.

18. The stormwater chamber of claim 17, wherein the fin has a vertical height which is 30% to 80% of a vertical height of the chamber.

19. The stormwater chamber of claim 18, wherein the fin vertical height is 40% to 60% of the vertical height of the chamber.

20. The stormwater chamber of claim 17, the fin's depth tapering from a greater depth adjacent to the one of the bases to a lesser depth above the one of the bases.

21. The chamber according to claim 17, wherein said stormwater chamber is formed of a cellular plastic foam.

* * * * *